United States Patent
Baker

(10) Patent No.: US 7,685,073 B2
(45) Date of Patent: Mar. 23, 2010

(54) METHODS FOR NEGOTIATING AGREEMENT OVER CONCEALED TERMS THROUGH A BLIND AGENT

(76) Inventor: Paul L. Baker, 4119 Military Rd., NW., Washington, DC (US) 20015

( * ) Notice: Subject to any disclaimer, the term of this patent is extended or adjusted under 35 U.S.C. 154(b) by 1097 days.

(21) Appl. No.: 10/627,919

(22) Filed: Jul. 28, 2003

(65) Prior Publication Data
US 2007/0005962 A1 Jan. 4, 2007

Related U.S. Application Data

(60) Provisional application No. 60/399,189, filed on Jul. 30, 2002.

(51) Int. Cl.
*G06Q 20/00* (2006.01)
(52) U.S. Cl. .............. 705/80; 705/35; 705/50; 705/78; 713/168; 713/169; 380/277
(58) Field of Classification Search .......... 705/50–59; 713/168
See application file for complete search history.

(56) References Cited

U.S. PATENT DOCUMENTS

| | | | | |
|---|---|---|---|---|
| 5,615,269 A * | 3/1997 | Micali | ............. | 705/80 |
| 5,794,207 A * | 8/1998 | Walker et al. | ............. | 705/1 |
| 5,960,080 A * | 9/1999 | Fahlman et al. | ............. | 380/252 |
| 6,598,027 B1 * | 7/2003 | Breen et al. | ............. | 705/26 |
| 7,159,119 B2 | 1/2007 | Wilson et al. | | |
| 7,181,017 B1 * | 2/2007 | Nagel et al. | ............. | 380/282 |
| 7,197,142 B2 * | 3/2007 | Alten | ............. | 380/46 |
| 7,302,582 B2 * | 11/2007 | Snapp et al. | ............. | 713/185 |
| 2002/0184153 A1 * | 12/2002 | De Vries | ............. | 705/50 |
| 2003/0039357 A1 * | 2/2003 | Alten | ............. | 380/46 |
| 2004/0210763 A1 | 10/2004 | Jonas | | |
| 2005/0080723 A1 * | 4/2005 | Burchetta et al. | ............. | 705/39 |
| 2005/0198490 A1 * | 9/2005 | Jaganathan et al. | ............. | 713/151 |
| 2007/0106621 A1 * | 5/2007 | Burchetta et al. | ............. | 705/80 |

OTHER PUBLICATIONS

Ströbel Michael "A Framework for Electronic Negotiations Based on Adjusted Winner Mediation"Proc. DEXA 2000 Workshop on e-Negotiations, London, UK.*
Ströbel Michael "A Matchmaking Component for the Discovery of Agreement and Negotiation Spaces in Electronic Markets" In: Proc. Group Decision and Negotiation Conference, La Rochelle, France, 2001, pp. 61-75.*
Ströbel Michael "Design of Roles and Protocols for Electronic Negotiations" Electronic Commerce Research, Special Issue on Market Design, vol. 1, No. 3, 2001, pp. 335-353.*

(Continued)

*Primary Examiner*—Andrew J. Fischer
*Assistant Examiner*—Mamon Obeid
(74) *Attorney, Agent, or Firm*—Cahn & Samuels LLP

(57) ABSTRACT

The present invention relates to methods, processes, apparatus, algorithms, etc., for secure identification of secret answers that satisfy secret questions. The methods, etc., can be used for the negotiated exchange of information, goods, or services when the Seeker and the Provider conceal their negotiating positions.

4 Claims, 2 Drawing Sheets

OTHER PUBLICATIONS

Ströbel Michael, "Communication Design for Electronic Negotiations" Proc. 10th World Wide Web Conference, Hong Kong 2001, ACM Press, New York, pp. 9-20.*

"Shared Secrets and the Gene Estate Agent," Proprietary Power Point Presentation, May 23, 2001.

Gene Estate Agent, "An On-line Brokerage Service for Genomic Information and Other Marketable Knowledge," Proprietary Draft Document, Jan. 16, 2001.

Proprietary Internal Memorandum, "How to Proceed with Gene Estate Agent," May 30, 2001.

* cited by examiner

METHODS FOR NEGOTIATING AGREEMENT OVER CONCEALED TERMS THROUGH A BLIND AGENT

This application claims the benefit of U.S. Provisional Application Ser. No. 60/399,189, filed Jul. 30, 2002, which is hereby incorporated by reference in its entirety.

DESCRIPTION OF THE INVENTION

Figure 1:
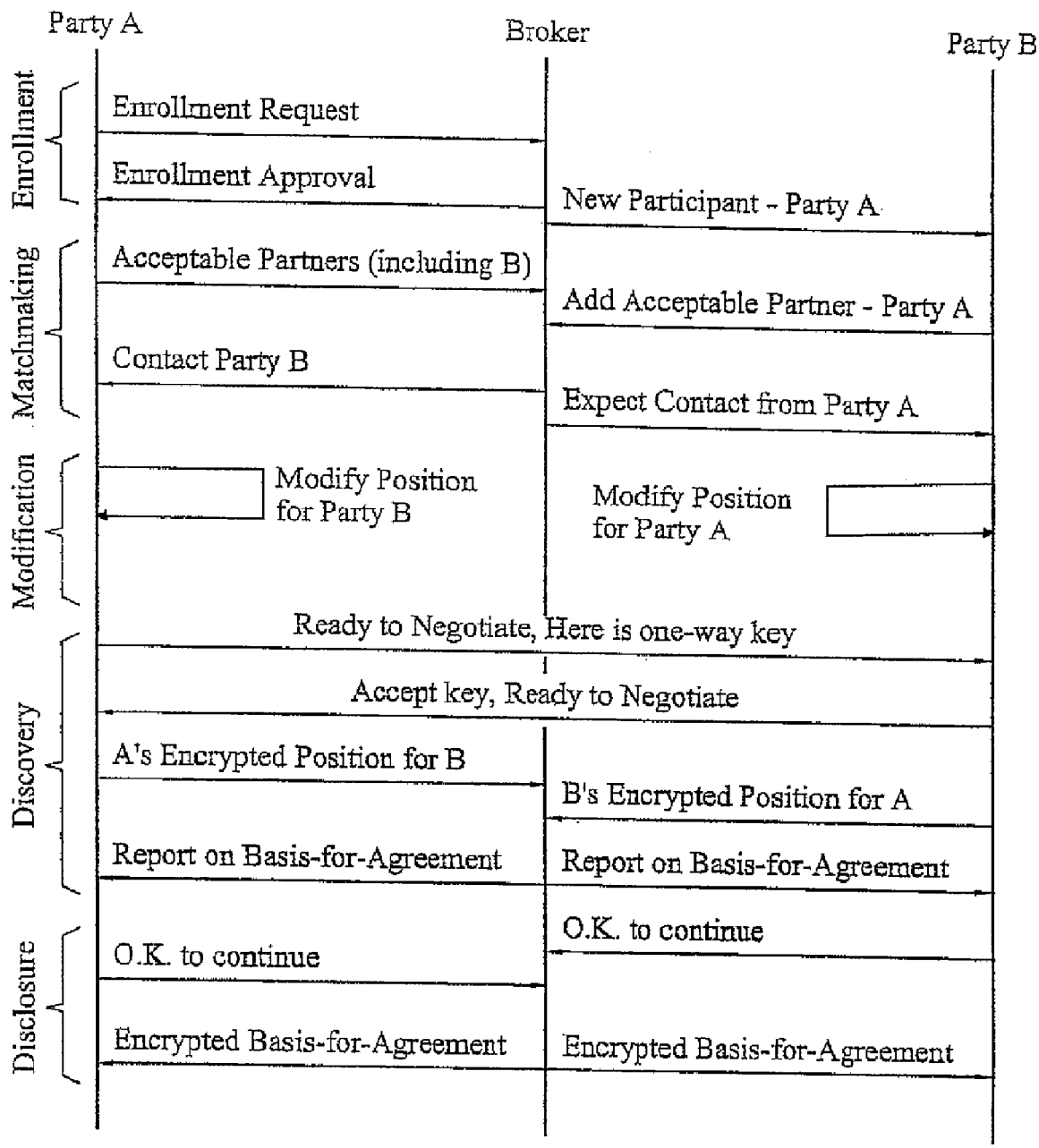
FIG. 1. Transition Diagram for the Method of Operation. The diagram shows the enrollment of Party A in the market and the subsequent negotiation between A and B. The enrollment of Party B and the initial preparation of negotiating positions are not shown to simplify the diagram.

The present invention relates to methods, processes, apparatus, algorithms, etc., for secure identification of secret answers that satisfy secret questions. The methods, etc., can be used for the negotiated exchange of information, goods, or services when the Seeker and the Provider conceal their negotiating positions.

Current methods for integrating separately maintained databases that contain highly sensitive information, e.g. those related to national security, are unacceptable because they expose the sensitive material to widespread exploitation. Thus, integration may foster both beneficial and malicious use of the data. The present invention allows a seeker of information to become aware of the existence of matching information in the possession of a different party. Accordingly, the identification of a mutual, but limited, shared interest can be accomplished without compromising the information or the search for same.

Business methods for the brokered sale of goods and property on-line, i.e. via the Internet, are unable to tailor the transaction for the identity and business attributes of the buyer and seller. Generally, the seller must publicly disclose all items and particulars including price without concern for the identity of the parties who may view and take advantage of this information. In contrast, traditional negotiations between business entities have emphasized the particular history of the two parties, the size and nature of the purchase requirement, and various detailed considerations such as schedule, volume and future options. In addition, some sales involve sensitive or confidential information. These are typically negotiated face-to-face after the implementation of non-disclosure agreements. The present invention enables a modern on-line environment to employ practices that are familiar from traditional, off-line, business.

The present invention relates to methods for conducting a negotiation between two parties through a Broker in a way that conceals the negotiating position of the two parties using encryption. By means of the novel method, the Broker finds a basis-for-agreement containing specific terms that are mutually acceptable to both parties according to their respective negotiating positions. The method can conceal the full negotiating position from the opposite party and the Broker.

In the context of intelligence data agencies, the negotiation method applies as follows. The negotiation position of the two parties consists of the questions they are pursuing in connection with investigations and the answers they are prepared to provide. The Broker's role is to find a basis-for-agreement that identifies encrypted matches between questions and answers with an estimate of the relevance of the answers to the questions. As in the commercial application, the Broker protects secret data until the pairs of parties agree to exchange it directly and the Broker remains unaware of the clear-text content of the basis for agreement.

The invention answers a need that is present in several different negotiations. The following examples illustrate its applications without exhausting the possibilities: Intelligence Data—an agency that pursues an investigation wishes to conceal the depth of its inquires and the exact subject of investigation. A sister agency has information that may be of value but it does not wish to reveal large amounts of information. The aggregate of the information might be employed to identify sources or gauge the effectiveness of the intelligence data gathering.

Price discrimination—a buyer may have different price ranges in mind depending upon the reputation or past performance of the seller. The seller, in turn, may accept different payment depending upon the volume, the delivery schedule or buyer's history of prior purchases. Neither party can publicly disclose all their acceptable options because the options are not universally available—the acceptable options depend on the identity of the other party—and the options are dependent on details of each sales contact such as volume and schedule.

Competitive advantage—the buyer may be reluctant to disclose all resource requirements publicly because that information, taken in its entirety, conveys information to competitors.

Intellectual property—a seller may wish to offer intellectual property for licensing but may be reluctant to disclose all the property available for sale because that information, taken in its entirety, discloses competitive information on the seller's research program. Similarly, the purchaser of intellectual property may be reluctant to disclose all the desired property out of concern that the full requirement reveals future product plans.

Confidential Employment Objectives—an individual may seek new employment but may not wish to reveal the search to some potential employers, e.g., the individual's current employer. On the other side, a potential employer may be reluctant to advertise for resumes knowing that many prospective employees will embellish their resumes to fit the advertised job requirements.

Well-known encryption techniques can be employed so that the Broker can find the basis for agreement between the parties by discovering shared but encrypted secrets. The Broker then facilitates a protocol between the parties that causes the basis-for-agreement to be revealed in unencrypted, clear text without revealing any terms in the negotiating position that do not contribute to the basis-for-agreement.

The novel enhancement to encryption can be summarized as follows. It is well known that two parties can discover by encryption techniques whether they possess the same secret without ever revealing the secret. A common example of the technique in practice is the use of passwords to access a web server. Using the method advised for conforming implementations of the HTTP protocol, the Web browser does not send the password entered by the user. The browser holds the password as a secret and uses encryption to show the server that it possesses the same secret password that is known to the server.

By extension of this method, it is clear that two parties can identify which secrets in a set (e.g. a series of passwords) they have in common without betraying the secrets that are not shared. This invention extends the shared-secrets encryption technique in two ways. First, one party has questions, queries, or requirements while the second has corresponding answers, responses, or resources. Questions and answers are both held secret and the parties wish to determine if there are matching questions and answers. Second, this invention introduces a third party, the Broker and provides a software process for the Broker to compare encrypted questions with encrypted answers and pair questions with answers without actually decrypting the information.

The well-known encryption techniques that can be used to implement the new invention are these: public key encryption and one-way encryption. During the encrypted negotiation, all information exchanges are protected by public key encryption so that only the intended recipient can decrypt the information; moreover, the recipient can authenticate the identity of the sender. In addition, one-way encryption is used to prevent the Broker from decoding the content of the messages that describe the terms and bids of the buyer and seller.

These encryption techniques are coupled with well-known descriptive methods of which the foremost example is XML. For any descriptive method, including XML, the invention divides the vocabulary of the descriptions into nouns, verbs, adjectives and prepositions. One-way encryption is applied to nouns and adjectives but not to conjunctions, verbs and prepositions. When this partial encryption is applied to a sentence of the description, the result is a statement that cannot be interpreted precisely, although the relationship of the unknown words is still apparent. Sentences subjected to this partial encryption can be compared meaningfully without decoding the encrypted elements of the sentences. This partial encryption is the key component of the invention that allows the Broker to determine if there is a basis for a negotiated contract in the encrypted negotiating positions of the two opposite parties.

The basis-for-agreement takes the form of an encrypted statement that the Broker can determine will be acceptable to both parties, although the content of the encrypted statement is not known to the Broker. The Broker arranges for additional negotiations between buyer and seller only when there is an apparent basis-for-agreement. When additional negotiations are acceptable to all three parties, the Broker sends the encrypted basis-for-agreement to the buyer and seller. These two parties are able to understand the basis and proceed.

In summary, a Broker has brought two parties into detailed negotiations over the terms of a contract finalizing an agreement that is consistent with the hidden bargaining positions of the parties.

The present invention relates to methods for negotiating an agreement for sale, transfer of property, exchange of sensitive intelligence data, or other contractual arrangement when the two parties to the agreement wish to conceal their negotiating positions, e.g., their prices, their requirements, their schedule, the extent of the knowledge, the extent of their search, etc.;

methods for a Broker to assist two parties in a negotiation described in claim 1 so that the parties find a basis-for-agreement consisting of the terms of a potential contract involving particular items, prices, or other terms pertaining to the agreement without at any point revealing all of the items, prices or other terms that were open to negotiation but not disclosed to the opposite party;

methods to prevent the Broker from learning the negotiating positions of the parties it assists and from learning the content of any basis-for-agreement that it may find;

methods whereby a Broker, having found a mutually agreeable, but concealed, basis-for-agreement between two parties in a negotiation—as described in claim 2—may disclose the content of the basis-for-agreement to the two parties without compromising the secrecy of their respective negotiating positions;

methods for negotiation where the identity of the parties is known to the Broker and authenticated in every communication that pertains to negotiations but the identities are revealed to the Participants according to terms disclosed by the Broker and agreed to by the Participants;

methods for negotiation whereby a party to a negotiation may require the identity of the opposite negotiation party; furthermore, each party may specifically modify its negotiating position depending on the identity of the opposite party in a negotiation. Through encryption, as described in subsequent claims, the negotiating position—including any specific modifications—will be concealed from both the opposite negotiating party and the Broker;

methods for negotiation whereby one or both of the parties may use the Broker as an intermediary to conceal their identity for part or all of the negotiation. This otherwise obvious claim is novel because the invention conceals the negotiating positions from the Broker even though the Broker conducts the negotiation on behalf of the parties;

methods for combining a standardized markup language, such as XML, with encryption technology so that the textual statements that comprise a negotiating position will be unreadable; yet, a third party, the Broker, may compare two negotiating positions without understanding their content;

an extension of the encryption process for verifying shared secrets so that the process will verify that a secret answer matches a secret question;

method whereby all steps in the complex negotiation described by any of the aforementioned methods may be facilitated by three software processes acting respectively on behalf of the Broker and the two parties to the negotiation. With this implementation in three software processes, the negotiation process becomes convenient for use over a communication network such as the Internet. Each software process is responsible for:

a. Implementation of double public-key encryption on all communication between processes to ensure the privacy of the communication and authenticate the sender.

b. Implementation of one-way encryption on the statements of the negotiating position so that no party may read the position without possessing a dictionary containing a vocabulary and the encrypted equivalent of each term.

c. Negotiation according to protocols established by the Broker including the creation and exchange of one-way encryption keys, the transfer of encrypted negotiating positions and the eventual disclosure of the basis-for-agreement.

d. Direct interaction with the owner of the software process (the Broker or a party to the negotiation) through a graphical user interface, typically through a standard Web Browser. Direct interaction is required by each party in the negotiation to formulate the negotiating position, to select negotiation partners, to customize, if desired, the negotiating position, and to approve/disapprove a continued negotiation after notifications from the Broker. Direct interaction is required by the Broker only to the extent the Broker actively manages the authorizations to participate in negotiation and actively approves the final disclosure of the basis-for-agreement. It is envisioned that some Brokers may allow their corresponding software process to function autonomously.

The invention relates to methods involving a Broker and any number of other Participants. The Broker can arrange for negotiation between pairs of Participants playing opposite roles, e.g., buyer and seller, owner and licensee, or employer and candidate. A Broker may conduct many negotiations at the same time but each negotiation is independent. For illustrative purposes, methods of the invention will be described from four interrelated viewpoints:

1. Method of Operation
2. Application of Encryption
3. Software Process
4. Optional Process Features
5. Broker's Policy We use this 5-part description so that we can describe "Methods of Operation" without complications from encryption or software process. The technical description is completed by parts two and three. Part 4 describes technical processes that are not needed for a minimal implementation of the invention but are likely be employed by many production applications.

Prior to any negotiations, the Broker builds a market in several steps:

1. Declare the intention of the market; that is, the type of goods, services, information, or property that will be exchanged through negotiations in the on-line market. A Broker may operate several markets that are clearly distinct and separate.

2. Develop a descriptive vocabulary that the Participants can use to describe what they offer or what they seek in the negotiation.

3. Declare in advance the rules that apply during the negotiations and set any fee for services.

4. Optionally, the broker may conduct an ontology negotiation to determine the vocabulary and syntax for the descriptions.

The method of operation during a negotiation can comprise one or more the following seven phases:

1. Enrollment—to enroll with the Broker, a Participant can supply the same information that would be required to under normal business or agency rules to conduct the exchange of the subject property. During enrollment, the Broker can ensure that each Participant is qualified to participate in a negotiation leading to a binding contract or agreement.

2. Position Statement Preparation—each Participant prepares a preliminary negotiating position. If one Participant wishes to play two roles, e.g. buyer and seller, the Participant can prepare two such position statements. The position statements are prepared according to vocabulary and encoding rules supplied by the Broker. The Broker does not receive a copy of the position; it is considered propriety property of the Participant. This step, however, can be deferred in time and combined with Step 4.

3. Matchmaking—in a time and manner determined by the Broker, the Participants are paired for subsequent negotiation. How this occurs is a matter of policy, see Part 4 below, but for most useful applications, the Broker's policies will allow a Participant to see a list of potential negotiation partners. Generally, a Participant will have an opportunity to make a concealed selection of acceptable negotiation partners. After the Broker has ascertained the willingness of the Participants to work together in pairs, the Broker will inform each Participant about which Parties wish to engage in negotiation.

4. Position Statement Modification—following matchmaking, there is an intentional delay to give each Participant time to modify their position statement so that it is specific for each potential negotiation partner. There are a number of reasons to allow this modification but a Participant can decide to forego modification and keep one position for all negotiations. In a few markets, the identity may not be known; therefore, the modification step does not apply. (See Part 4).

5. Discovery Encounter—Each party sends an encrypted negotiating position to the Broker. When the Broker has received the position for both parties, the Broker compares the encrypted positions and notifies each party about the extent, if any, of a potential agreement on terms. At this time, the Broker does not know the content of the basis-of-agreement because it is protected by encryption. For this reason, the Broker gives only a statistical overview of the basis-of-agreement.

6. Disclosure Encounter—assuming that all three parties agree to proceed to the next step, the Broker provides each of the other two parties with a copy of the encrypted basis-for-agreement. Because of the encryption technique, which we describe below in "Application of Encryption", each of the two parties can immediately decode the basis-for-agreement. The two parties never, however, received a full copy of the opposite party's negotiating position. Each party learns only the information that is contained in the basis-for-agreement. The Broker may establish a policy requesting a readable copy of the basis-for-agreement. However, the Broker cannot obtain a copy except by receiving it from one of the two parties.

7. Conclusion of Agreement—the basis-for-agreement is developed into a legally binding agreement in a conventional manner by direct negotiation between the two parties. In most situations, the parties will pay a prearranged fee to the Broker for the Broker's services during Phases 1 through 6 negotiation.

The negotiation process may be repeated according to the policies established by the Broker when one or both parties to an earlier negotiation have modified their position and notified the Broker of the change.

This method of operation allows for some minor variations for special circumstances that we will now describe:

If one Participant or both wish to remain anonymous, the Broker can support an anonymous negotiation through indirect negotiation. Indirect negotiation can use additional software process functions as described below.

After Phase 5, the Broker has the capability to disclose the complete negotiating position of one party to the opposite party. The Broker may use to enforce its policies on the two parties to the negotiation.

After each negotiation has concluded, the Broker may keep a historical record of the negotiation and its outcome. The Broker may use the historical record for statistical information to quantify the success rate of the negotiation process and to identify any Participants who abuse the rules.

Application of Encryption

The method of operation is applicable to any market where the items for sale or negotiation can be described easily in a formal language. By formal language, we mean any system for denoting meaning that uses a predefined vocabulary and rules for the construction of syntactically correct statements. For the intended application area, XML is the likely choice for the formal language.

The negotiation entails the exchange of information according to a protocol defined by the rules established by the Broker. Encryption is used to control who sees what information at each point of the negotiation. Encryption methods represent prior art that we have adapted for the purposes of the novel business method. In the following points, the use of encryption will be described.

1. One-way key encryption—a common encryption method, which can be used for the new business method, uses a single key to encrypt information in a way that cannot be reversed by any known method. As an example, consider the password field seen in many forms that appear on the World Wide Web. A secure system can challenge an outsider by presenting a password field in a form. The outsider will reply by supplying a password. The outsider's Web Browser will combine the password with part of the challenge text and apply one-way encryption to both. The result can be sent in clear text over the network. The server can perform a similar encryption itself. If the server and the outsider produce exactly the same result, the server knows that the outsider possesses the password and is entitled to service.

2. Code Dictionaries—the one-way key encryption algorithm described in point 2 can be applied to a dictionary of words or phrases. The result is a codebook that translates in both directions. Thus, a one-way key can be used for communication if both the sender and receiver use the same codebook. The application of this encryption technique in the method of operation is the following. The unencrypted dictionary is distributed freely and publicly. Two parties who are interested in using a codebook will then agree on a unique one-way key and then independently derive the codebook from the dictionary.

3. Public key encryption—a system that uses two keys that work asymmetrically. Initially, one party possesses both keys and no other party has knowledge of either key. That party designates one key as the private key and never shares it with any other party. The second key becomes the public key, which is widely published. Information encrypted by one key can only be decrypted by the corresponding partner key.

a. Digital signatures a party that owns a private key with a published public key can establish their identity by using the private key to sign documents. This capability is essential to building trust in the negotiation process.

b. Secure, Authenticated message transfer. A public key encryption system can be used to send a message so that only the intended recipient can read it and so that the recipient can authenticate the identity of the sender. The sender first encrypts the message with the sender's private key. The sender then encrypts the message a second time with the recipient's public key. The message is then sent. The recipient decrypts in reverse order: first with the recipient's private key and then with the sender's public key. No other party can accomplish both steps. Moreover, the process will fail if the sender did not use the private key that corresponds to their published public key.

c. The public key encryption system can be used to exchange one-way keys for the construction of a codebook.

4. Symmetric key encryption—a method for encrypting a text with one key and decrypting the text with the same key. This method has no properties that are essential to the invention. It is common practice, however, to use symmetric key encryption in conjunction with public key encryption for secure, authenticated message transfer. Secure, authenticated message transfer employing a public key method is used at the beginning of a session to exchange a symmetric key. The symmetric key is then used for subsequent secure, authenticated message transfer during the same session. The advantage of this approach is that symmetric key computations are faster than public key computations.

5. Comparison of Shared Secrets—this encryption technique permits the comparison of secret negotiating positions. In practice, the two parties apply the one-way key encryption to their negotiating positions using a key that they share but the Broker does not possess. Identical terms in both negotiating positions will encrypt to identical values. The Broker can then compare the positions and locate the identical terms.

6. Comparison of Secret Value Ranges—the algorithm in point 5 above is not applicable to parameters that have continuous ranges. Where such values are important, the software process will employ the algorithm discussed under "Optional Process Features".

Software Process

Software Process by Scenario Steps

The method of operation can be supported by three software processes, one for the Broker and one for each of the two parties in the negotiation. Initially, only the Broker has a process. When a Participant enrolls in the market, the Participant receives a copy of the software for installation. The Participant also receives the following information from the Broker:

A dictionary of words for the description of negotiating positions. The dictionary is fixed but the Broker may update it periodically to keep up with changes in the market.

A schema for descriptive statements in the negotiating positions. It is expected that most markets today will use an XML Schema or XML-DTD. Other schema methods, such as BNF grammar are acceptable. The schema is fixed and periodic updates are unlikely to be necessary.

A list of all the other Participants and their public encryption keys. However, for certain markets, the Broker may withhold a complete list and provide only partial information later.

For certain markets, the Broker may correspond individually with each new party to determine the descriptive schema and dictionary that is preferred by that party.

During enrollment, a party applies to the Broker for entry to a particular market established by the Broker. The applicant provides information on their identity including the public key associated with their identity. In most markets, there is an asymmetry of roles: buyer versus seller, seeker versus provider, etc. For any of these markets, a new party can tell the Broker upon enrollment which role is desired. Each party will be paired during matchmaking with partners who are willing to play the opposite role. A party may indicate a desire to play both roles. In that case, the party will be paired separately with partners for each role. In every negotiation, the parties are told which role they are playing so that they may prepare a suitable negotiating position for that role.

If the Broker accepts the enrollment, the Broker sends the new Participant the information listed above. When a Participant receives their enrollment information, the Participant installs the software and activates the software process that represents their interests in the negotiation.

After enrollment, a Participant may prepare a negotiating position for their role or roles. The preparation is accomplished with a syntax-directed editor configured to follow the schema. These editors are readily available commercial products that need not be described further. This preparatory step may occur at any time up until the point a Discovery Encounter is planned.

An operation of a software process in accordance with the present invention can proceed in the sequence shown in FIG. 1. We will discuss the process in the order of the steps shown from top to bottom in FIG. 1. FIG. 1 begins with the enrollment of a new Participant, Party A, as we have just described. The next Phase is Matchmaking. FIG. 1 assumes that the identity of the Participants is known to each other and that the approval of each is necessary to make a match. In certain markets, a Broker may have a different policy. In that case, one or more of the notifications during the Matchmaking phase may be absent. In the usual operation shown in FIG. 1, the addition of a new Participant causes the software process operating on behalf of the Broker to send notifications to all the software processes representing Participants already enrolled. The existing Participants can then indicate their willingness to negotiate with the new Participant. Likewise, the new Participant can indicate which of the existing Participants is acceptable. The Broker uses the information it acquires to identify pairs of Participants who are willing to assume opposite roles in a negotiation. When a pair is found, one member of the pair is contacted and asked to begin negotiation. The other member of the pair is advised to expect negotiation. When each party receives this notification, it immediately prepares a negotiating position for this particular one-on-one negotiation. Naturally, a party can use the same negotiating position for all situations, if desired.

In FIG. 1, the Broker asks Party A to begin. Consequently, Party A sends a unique one-way encryption key to Party B using the method of Public Key Encryption, Point 3b above. When Party B receives the key, it indicates its willingness to proceed by sending a message to Party A. Note that both Party A and Party B have an opportunity to delay or abort the negotiation. A delay may be needed to allow more time to complete the negotiating position. When both Parties are ready, they apply partial one-way encryption to their negotiating positions using the key exchanged earlier. Each party, sends its encrypted position to the Broker via Public Key Encryption.

When the Broker receives both positions, the Broker compares them to discover whether there exists an encrypted statement that is compatible with both positions. A Broker can find a compatible statement because the encryption has been applied selectively to nouns and adjectives of the statement while conjunctions, verbs and prepositions are left in clear text. When one or more compatible statements have been found, there is a basis-for-agreement. The Broker then notifies both parties and provides them with a description of how many common statements were found and what the subject of the agreement appears to be insofar as the Broker can determine this from the clear text. This step completes the Discovery Encounter.

At this point in the sequence of operation, the two parties have a final opportunity to consider whether they wish to proceed. The Broker has told them there is a basis-for-agreement. If they wish to learn what is in the basis-for-agreement, they need to approve the Disclosure Encounter. Assuming both parties agree, the Broker discloses the basis-for-agreement by sending it to each party privately via public key encryption.

Optional Process Features

Anonymous Parties

Figure 2:
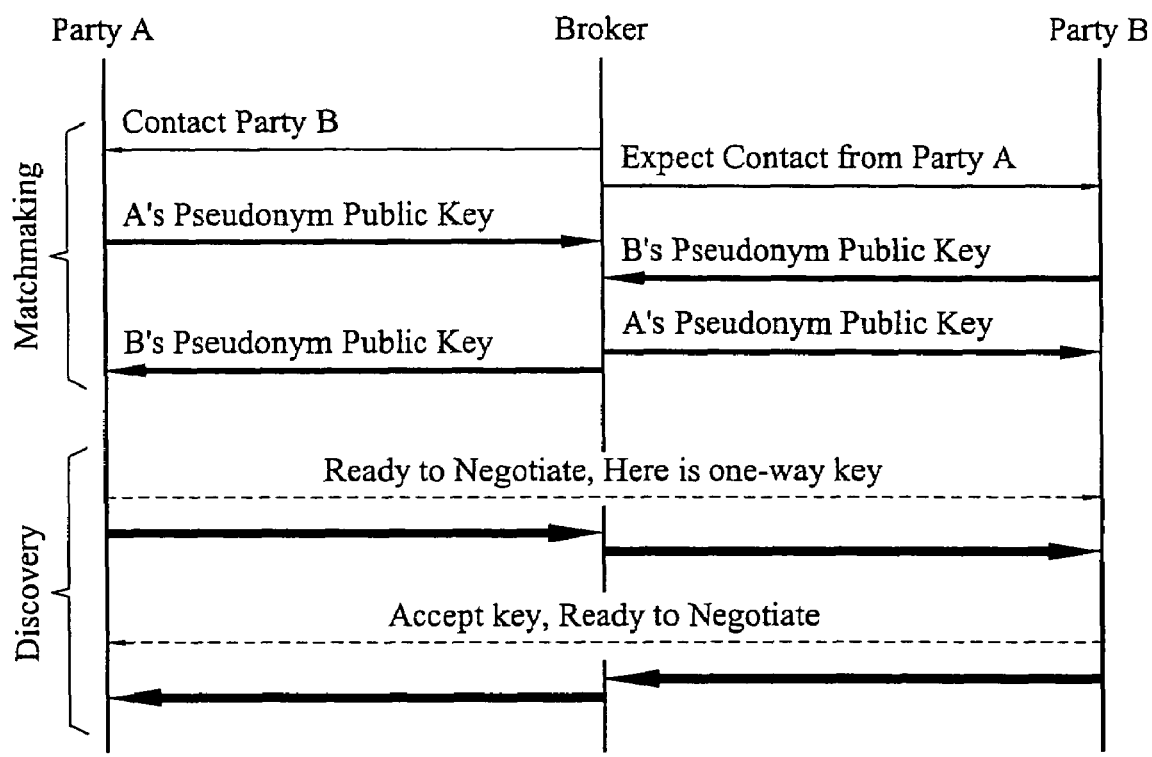
FIG. 2. Modifications to Transition Diagram for Indirect Operation. The diagram shows changes to FIG. 1 when the Identity of A and B are concealed from each other and information is passed between A and B via the Broker. The thin solid-lines show a subset of the transfers in FIG. 1. The medium-width lines show new transfers that are not found in FIG. 1. The thin dashed lines show transfers in FIG. 1 that are replaced in FIG. 2. The replacements are the interrupted thick lines shown below the dotted lines.

The software processes cannot perform one of the steps described in the previous paragraph—exchange of the one-way encryption key—without knowing the network addresses of the parties. If the parties desire to remain anonymous, then the software will not know where to send messages. The case of anonymous parties can be handled by indirect negotiation through the Broker. The modifications to FIG. 1 are shown in FIG. 2. An additional step is that each party selects a new public key for a pseudonymous identity. It sends this key to the agent, which then forwards the new public key to the opposite party. When the transitions in FIG. 1 use a direct transfer from A to B or B to A, the transitions are modified as shown in FIG. 2 so that the Broker accepts a message on behalf of an anonymous party and then delivers it. Because all messages have been encrypted to prevent third parties from eavesdropping, the Broker will be unable to read the message. Thus, the security features of FIG. 1 are preserved in FIG. 2 at the expense of some additional software process activity for the Broker.

Comparison of Secret Value Ranges

The Broker can easily compare encrypted values when the values are drawn from a discrete set that can be represented in the code book. This method fails, however, when the values are drawn from a continuous range and comparisons are based on inequalities between continually varying numeric values. For parameters with continuous value ranges, an optional, secret comparison method can be provided.

When this optional method is employed with the invention, numerical values and value ranges are concealed by a linear mapping of values using a secret offset and secret scaling factor. Suppose we start with a named set of values, or one value in the simplest case. We represent the named set as name={v1, v2, v3 . . . }. To compare secret value sets, we employ the same one-way encryption key in the following way. First, the name is encrypted as a number with 2n bits. Then the high order n bits are separated from the low order bits. The two numbers of n bits are converted to an offset, a, and scaling factor, b, which are then applied to values in the value set {v1, v2, v3 . . . } producing {v1, v2*, v3* . . . } where vn*=a+b·vn. The offset and scaling preserve the order relationship of the values; therefore, the values can be compared by the Broker even though the Broker does not know the original values.

Broker Policy

The present invention enables a Broker to bring novel and useful services to a variety of markets. In each market, the detailed procedures may vary. The only essential is an established policy for each market so that the participants understand how to satisfy their needs through the market and so that they perceive the market as fair. The Broker's policies are external to the invention, but we discuss some policy options here to elaborate on the operation of the invention.

Policy on Identification

The most important policy options for identification of the participants are: full identification, generic identification, and anonymity. The most common case is the first; the participants are likely to be companies identified by their Dun & Bradstreet or Tax Payer numbers. A generic identification categorizes the participant in a helpful way that does not reveal the full identity. For example, a company might be identified generically by approximate size and industrial sector. Finally, the Broker may allow anonymity. Under this policy, the Broker knows each participant but refers to participants by pseudonyms or meaningless identity numbers during negotiations.

A Broker may establish a policy that reveals a more specific identification as the negotiation proceeds. Note also that in every negotiation there are two roles. The Broker may establish a different identification policy for each role. For example, in a market for jobs, the Broker may list the employers by full name but not reveal the names of the job seekers until the Disclosure Encounter.

Direct vs. Indirect vs. Surrogates

For the common case of full identification of the participants, the direct method described in FIG. 1 is most efficient. If the participants are anonymous, however, the Broker's policy must use the indirect method of FIG. 2.

The privacy and secrecy of the invention depend on the separation of the three software processes. In some markets, one of the parties may not wish to install and operate the process. In that case, the Broker may establish a policy allowing an independent fourth party to participate in the transaction as the surrogate representative of a participant who cannot or will not manage the software process. The Broker cannot play the surrogate role, because it would then acquire the ability to acquire the one-way keys and read the negotiating positions. However, a Broker may establish relationships with other reputable agents who then serve as surrogates.

Obligations to the Broker

A Broker can establish policies that specify its rights and compensation in the transaction. The compensation is fee based and the fee may include initial setup and/or fees per negotiation, and/or fees per successful outcome. A Broker will also have a policy concerning the revelation of the basis-for-agreement. In principle, a Broker cannot read the basis-for-agreement but it might establish a policy that the parties should communicate that information to the Broker at the close of the negotiation.

Continued or Repeated Negotiations

If the participants remain in a market for very long, it is likely that their negotiating position will change. The Broker can have a policy about how often and for what reason the matchmaking and discovery processes are repeated.

In accordance with the above-discussion, the present invention relates to methods, processes, and apparatus (e.g., a computer loaded with software effective to carry out the methods and processes) for comparing secret information, comprising one or more of the following steps in any effective order, e.g., a) determining a match between at least one encrypted information file and at least one encrypted search request file without removing said encryption, b) revealing said match to the sources of said files wherein said match is capable of being decrypted by said services, and/or c) concealing non-matches from said sources.

As indicated above, the "secret information" can comprise any data that the parties wish to exchange, such as intelligence data, price information, intellectual property holdings, etc. An encrypted information file is the information that a "seller" or other participant supplies to the Broker describing what he offers in the negotiation. For example, if the seller is selling used automobiles, it could be a list of the automobiles for sale, including any relevant data about them, such as model, price, and mileage. An encrypted search request file is the information provided by a "buyer" or other participant describing what he seeks in the negotiation. As already discussed, encryption of the information can be accomplished by any suitable encryption technology. The phrase "determining a match" indicates that the broker ascertains whether there is any agreement or correspondence between the positions set forth by the participants in their respective files. Correspondence or matching information can be determined by any effective method of comparing encrypted factual statements (e.g., contained in an information file provided by a "seller") with encrypted query statements (e.g., contained in a search file provided by a "buyer").

An effective method can rely on well known method to determine the existence of a mutual shared secret. For the comparison described here, shared secret words are found in a semantic context established by unencrypted grammatical keywords. For example, the encrypted files can comprise structured data. By the phrase "structured data," it is meant data values that are organized in statements each of which obeys grammar rules, i.e. is a realization of rules of a production grammar. In one embodiment, structured data can comprise unencrypted keywords and encrypted vocabulary. The unencrypted keywords identify the grammatical rule for the statement while the encrypted vocabulary conveys the content of the statement, but only to a recipient who can decrypt the vocabulary. For example, in the formal computer language "C", a statement: "if (x=1) y=2; else y=3;" has two keywords, "if" and "else", a punctuation mark ";", and five words from the vocabulary, "x", "y", "1", "2", "3". For this method, the keywords and punctuation (if used) are not encrypted while the vocabulary words are replaced with encrypted symbols following the procedures described in the application.

Once a match between information offered by one participant, and sought by another, is discovered by a broker, such discovery is revealed to the participants. The existence of a match can again be provided to the participants in an encrypted form for security purposes, but also so that the broker is unable to read it ("the blind agent"), maintaining the secret between the parties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. The entire disclosure of all applications, patents and publications, cited above and in the figures are hereby incorporated by reference in their entirety.

What is claimed is:

1. A method of negotiation between parties via a networked computer system, comprising:

enrolling a first party computer for a negotiation by the networked computer system;

enrolling a second party computer for the negotiation by the networked computer system;

transmitting a predefined vocabulary and a syntax rule from a broker computer to the first party computer and to the second party computer to describe goods, services, information, or property to be exchanged through the negotiation via a graphical user interface, the first party computer and the second party computer each preparing a negotiation position comprising statements according to the predefined vocabulary and syntax rule provided by the broker computer, the first party computer sending an encryption key to the second party computer without sending the encryption key to the broker computer;

the first party computer and the second party computer each partially encrypting their negotiation positions by applying the encryption key, wherein each partially-encrypted negotiating position comprises statements comprising encrypted words and non-encrypted words;

transmitting files comprising the partially encrypted negotiation positions from the first party computer and from the second party computer to the broker computer;

said broker computer comparing statements in the transmitted files from the first party computer and the second party computer;

said broker computer identifying the syntax rule of each statement from the unencrypted words and locating identical encrypted words in the statements;

said broker computer comparing the negotiation positions of the first party computer and the second party computer to find a statement or statements in both negotiation positions;

said broker computer transmitting to the first party computer and the second party computer a basis-for-agreement comprising statements comprising encrypted words found in both negotiating positions;

said first party computer and the second party computer decoding the basis-for-agreement with the encryption key.

2. A method according to claim 1, comprising:

the first party computer and second party computer each preparing a negotiation position which comprises a named set of numerical values, the first party computer and second party computer applying said encryption key to the name of the set of numerical values thereby obtaining an offset and a scaling factor, applying linear mapping using the offset and the scaling factor to conceal the numerical values of the named set and preserve the order relationship of the numerical values, and said broker computer comparing the numerical values to which the offset and scaling factor have been applied without knowing the original values.

3. A method according to claim 1, wherein nouns and adjectives are encrypted in a partially-encrypted negotiating position.

4. A method according to claim 3, wherein conjunction, verbs and prepositions are non-encrypted in a partially-encrypted negotiating position.

* * * * *